(12) United States Patent
Zhang et al.

(10) Patent No.: US 10,237,046 B2
(45) Date of Patent: Mar. 19, 2019

(54) CELL STATUS CHANGING METHOD, USER EQUIPMENT, AND BASE STATION

(71) Applicant: Huawei Technologies Co., Ltd., Shenzhen (CN)

(72) Inventors: Hongping Zhang, Shanghai (CN); Qinghai Zeng, Shanghai (CN); Qufang Huang, Shanghai (CN); Wenji Liu, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 97 days.

(21) Appl. No.: 14/992,441

(22) Filed: Jan. 11, 2016

(65) Prior Publication Data

US 2016/0127107 A1 May 5, 2016

Related U.S. Application Data

(63) Continuation of application No. PCT/CN2013/079265, filed on Jul. 12, 2013.

(51) Int. Cl.
*H04L 5/00* (2006.01)
*H04W 72/04* (2009.01)

(52) U.S. Cl.
CPC ............ *H04L 5/0098* (2013.01); *H04L 5/001* (2013.01); *H04W 72/042* (2013.01)

(58) Field of Classification Search
None
See application file for complete search history.

(56) References Cited

U.S. PATENT DOCUMENTS

| 2012/0176926 A1* | 7/2012 | Jang | H04W 24/02 370/252 |
| 2013/0114577 A1* | 5/2013 | Cai | H04W 56/0045 370/336 |

(Continued)

FOREIGN PATENT DOCUMENTS

| CN | 102098765 A | 6/2011 |
| CN | 102740443 A | 10/2012 |

(Continued)

OTHER PUBLICATIONS

"3rd Generation Partnership Project; Technical Specification Group Radio Access Network; Evolved Universal Terrestrial Radio Access (E-UTRA) and Evolved Universal terrestrial Radio Access Network (E-UTRAN); Overall Description; Stage 2 (Release 11)," 3GPP TS 36.300, V11.6.0, Jun. 2013, 209 pages.

(Continued)

*Primary Examiner* — Brandon M Renner
*Assistant Examiner* — The Hy Nguyen
(74) *Attorney, Agent, or Firm* — Slater Matsil, LLP

(57) ABSTRACT

Embodiments disclose a cell status changing method. The method includes receiving, by user equipment, a first indication sent by a master base station, where the first indication is used to indicate a status change of a first cell of the master base station or a status change of a second cell of a secondary base station; and performing activation on the first cell or the second cell according to the first indication, or performing deactivation on the first cell or the second cell according to the first indication. In embodiments, both the master base station and the secondary base station serve the UE and undergo carrier aggregation, and the UE may obtain, by using the received first indication sent by the master base station, an active state or an inactive state of a serving cell that belongs to a base station that serves the UE.

14 Claims, 5 Drawing Sheets

(56) References Cited

U.S. PATENT DOCUMENTS

| | | |
|---|---|---|
| 2014/0023055 A1 | 1/2014 | Jeong et al. |
| 2014/0029575 A1 | 1/2014 | Zeng et al. |
| 2014/0308921 A1 | 10/2014 | Zhang |
| 2015/0099501 A1* | 4/2015 | Kim ............... H04W 52/0216 455/418 |
| 2015/0373559 A1* | 12/2015 | Hong ............... H04W 16/32 370/329 |
| 2016/0157219 A1* | 6/2016 | Uemura ............... H04W 16/00 370/329 |

FOREIGN PATENT DOCUMENTS

| | | | |
|---|---|---|---|
| CN | 103188663 A | | 7/2013 |
| EP | 2849359 A1 | | 3/2015 |
| JP | 2005136779 A | * | 5/2005 |
| WO | 2012136256 A1 | | 10/2012 |
| WO | 2012138157 A2 | | 10/2012 |
| WO | 2012154325 A1 | | 11/2012 |
| WO | 2013079092 A1 | | 6/2013 |
| WO | 2014208732 A1 | | 12/2014 |

OTHER PUBLICATIONS

"3rd Generation Partnership Project; Technical Specification Group Radio Access Network; Evolved Universal Terrestrial Radio Access (E-UTRA); Medium Access Control (MAC) Protocol Specification (Release 11)," 3GPP TS 36.321, V11.3.0 Jun. 2013, 57 pages.

"3rd Generation Partnership Project; Technical Specification Group Radio Access Network; Evolved Universal Terrestrial Radio Access (E-UTRA); Radio Resource Control (RRC); Protocol Specification (Release 11)," 3GPP TS 36.331, V11.4.0, Jun. 2013, 346 pages.

Sharp: "PCell vs. SCell With PUCCH for Inter-eNB CA," 3GPP TSG-RAN WG2#82, R2-132052, May 20-24, 2013, 6 pages, Fukuoka, Japan.

* cited by examiner

CELL STATUS CHANGING METHOD, USER EQUIPMENT, AND BASE STATION

This application is a continuation of International Application No. PCT/CN2013/079265, filed on Jul. 12, 2013, which is hereby incorporated by reference in its entirety.

TECHNICAL FIELD

The present invention relates to the field of communications technologies, and in particular, to a cell status changing method, user equipment (UE), and a base station.

BACKGROUND

To improve spectral efficiency and a user throughput of a communications system, a carrier aggregation (CA) technology, which is also referred to as a cell aggregation technology, is introduced into a Long Term Evolution Advanced (LTE-A) system. The CA technology allows UE to simultaneously perform uplink and downlink communication by using multiple cells, so as to implement high-speed data transmission.

In the prior art, CA inside a base station is included, that is, for one UE, serving cells aggregated by the UE all belong to a same base station, and the base station delivers an activation command or a deactivation command to the UE, so as to activate or deactivate serving cells that belong to the base station. However, for CA between base stations, serving cells aggregated by one UE may belong to different base stations, and one base station in the different base stations generally serves as a master base station of the UE, and another base station serves as a secondary base station of the UE. How to manage activation or deactivation of serving cells that belong to multiple base stations during carrier aggregation is a problem expected to be resolved in the industry.

SUMMARY

Embodiments provide a cell status changing method, UE, and a base station, so as to manage activation or deactivation of serving cells that belong to multiple base stations during carrier aggregation.

To resolve the foregoing technical problem, the following technical solutions are disclosed in the embodiments.

According to a first aspect, a cell status changing method is provided. The method includes receiving, by user equipment, a first indication sent by a master base station, where the first indication is used to indicate a status change of a first cell of the master base station or indicate a status change of a second cell of a secondary base station, and both the master base station and the secondary base station serve the user equipment and undergo carrier aggregation; and performing, by the user equipment, activation on the first cell or the second cell according to the first indication, or performing deactivation on the first cell or the second cell according to the first indication.

With reference to the first aspect, in a first possible implementation manner of the first aspect, when the first indication is used to indicate the status change of the first cell of the master base station, the user equipment performs the activation or the deactivation on the first cell according to the first indication. The method further includes: receiving, by the user equipment, a second indication sent by the secondary base station, where the second indication is used to indicate the status change of the second cell of the secondary base station; and performing, by the user equipment, the activation or the deactivation on the second cell according to the second indication.

With reference to the first possible implementation manner of the first aspect, in a second possible implementation manner of the first aspect, the performing, by the user equipment, activation or deactivation on the first cell according to the first indication specifically includes: when the first indication is a first Media Access Control control element (MAC CE), determining, by the user equipment according to a status identifier of the first cell in the first MAC CE, to perform the activation or the deactivation on the first cell; and the performing, by the user equipment, the activation or the deactivation on the second cell according to the second indication specifically includes: when the second indication is a second MAC CE, determining, by the user equipment according to a status identifier of the second cell in the second MAC CE, to perform the activation or the deactivation on the second cell.

With reference to the second possible implementation manner of the first aspect, in a third possible implementation manner of the first aspect, the determining, by the user equipment according to a status identifier of the first cell in the first MAC CE, to perform the activation or the deactivation on the first cell specifically includes: determining, by the user equipment according to a bit that is in a bit map and that corresponds to a cell index of the first cell in the first MAC CE, to perform the activation or the deactivation on the first cell; and the determining, by the user equipment according to a status identifier of the second cell in the second MAC CE, to perform the activation or the deactivation on the second cell specifically includes: determining, by the user equipment according to a bit that is in a bit map and that corresponds to a cell index of the second cell in the second MAC CE, to perform the activation or the deactivation on the second cell.

With reference to the third possible implementation manner of the first aspect, in a fourth possible implementation manner of the first aspect, when the cell index of the first cell and the cell index of the second cell are respectively numbered by the master base station and the secondary base station, or the cell index of the first cell is the same as the cell index of the second cell, the method further includes: identifying, by the user equipment according to the received first indication, that the first cell corresponds to the master base station, and determining that the bit corresponding to the cell index of the first cell is valid; and identifying, by the user equipment according to the received second indication, that the second cell corresponds to the secondary base station, and determining that the bit corresponding to the cell index of the second cell is valid.

With reference to the first aspect, in a fifth possible implementation manner of the first aspect, when the first indication is used to indicate the status change of the first cell of the master base station, the first indication is further used to indicate the status change of the second cell of the secondary base station, and the method further includes: performing, by the user equipment, the activation or the deactivation on the first cell according to the first indication, and performing the activation or the deactivation on the second cell according to the first indication.

With reference to the fifth possible implementation manner of the first aspect, in a sixth possible implementation manner of the first aspect, the performing, by the user equipment, the activation or the deactivation on the first cell according to the first indication, and performing the activation or the deactivation on the second cell according to the first indication specifically includes: when the first indication is a Media Access Control control element MAC CE, determining, by the user equipment according to a status identifier of the first cell in the MAC CE, to perform the activation or the deactivation on the first cell, and determining, according to a status identifier of the second cell in the MAC CE, to perform the activation or the deactivation on the second cell.

With reference to the sixth possible implementation manner of the first aspect, in a seventh possible implementation manner of the first aspect, when both a cell index of the first cell and a cell index of the second cell are numbered by the master base station or the secondary base station, or a cell index of the first cell is different from a cell index of the second cell, the determining, by the user equipment according to a status identifier of the first cell in the MAC CE, to perform the activation or the deactivation on the first cell specifically includes: determining, by the user equipment according to a bit that is in a bit map and that corresponds to the cell index of the first cell in the MAC CE, to perform the activation or the deactivation on the first cell; and the determining, by the user equipment according to a status identifier of the second cell in the MAC CE, to perform the activation or the deactivation on the second cell specifically includes: determining, by the user equipment according to a bit that is in a bit map and that corresponds to the cell index of the second cell in the MAC CE, to perform the activation or the deactivation on the second cell.

With reference to the sixth possible implementation manner of the first aspect, in an eighth possible implementation manner of the first aspect, when both a cell index of the first cell and a cell index of the second cell are numbered by the master base station or the secondary base station, or a cell index of the first cell is different from a cell index of the second cell, the determining, by the user equipment according to a status identifier of the first cell in the MAC CE, to perform the activation or the deactivation on the first cell specifically includes: determining, by the user equipment according to a bit that is in a bit map and that corresponds to the cell index of the first cell in the MAC CE, to perform the activation or the deactivation on the first cell; and the determining, by the user equipment according to a status identifier of the second cell in the MAC CE, to perform the activation or the deactivation on the second cell specifically includes: determining, by the user equipment according to a bit that is in a bit map and that corresponds to the cell index of the second cell in the MAC CE, to perform the activation or the deactivation on the second cell.

According to a second aspect, a cell status changing method is provided. The method includes generating, by a master base station of user equipment, a first indication, where the first indication is used to indicate a status change of a first cell of the master base station or indicate a status change of a second cell of a secondary base station, and both the master base station and the secondary base station serve the user equipment and undergo carrier aggregation. The method also includes sending, by the master base station, the first indication to the user equipment, so that the user equipment performs activation on the first cell or the second cell according to the first indication, or performs deactivation on the first cell or the second cell according to the first indication.

With reference to the second aspect, in a first possible implementation manner of the second aspect, the first indication is a first Media Access Control control element MAC CE, so that the user equipment determines, according to a status identifier of the first cell in the first MAC CE, to perform the activation or the deactivation on the first cell, where the user equipment further receives a second MAC CE that serves as a second indication and that is sent by the secondary base station, so that the user equipment determines, according to a status identifier of the second cell in the second MAC CE, to perform the activation or the deactivation on the second cell.

With reference to the first possible implementation manner of the second aspect, in a second possible implementation manner of the second aspect, the method further includes: numbering, by the master base station, a cell index of the first cell of the master base station, where the cell index of the first cell is the same as or different from a cell index that is numbered by the secondary base station for the second cell, so that the user equipment identifies, according to the received first indication, that the first cell corresponds to the master base station, and determines that a bit corresponding to the cell index of the first cell is valid; and identifies, according to the received second indication, that the second cell corresponds to the secondary base station, and determines that a bit corresponding to the cell index of the second cell is valid.

With reference to the second aspect, in a third possible implementation manner of the second aspect, the first indication is further used to indicate the status change of the second cell of the secondary base station, so that the user equipment performs the activation or the deactivation on the second cell according to the first indication.

With reference to the third possible implementation manner of the second aspect, in a fourth possible implementation manner of the second aspect, the first indication is a first Media Access Control control element MAC CE, so that the user equipment determines, according to a status identifier of the first cell in the MAC CE, to perform the activation or the deactivation on the first cell, and determines, according to a status identifier of the second cell in the MAC CE, to perform the activation or the deactivation on the second cell.

With reference to the fourth possible implementation manner of the second aspect, in a fifth possible implementation manner of the second aspect, the method further includes numbering, by the master base station, both a cell index of the first cell and a cell index of the second cell, so that the user equipment determines, according to a bit that is in a bit map and that corresponds to the cell index of the first cell in the MAC CE, to perform the activation or the deactivation on the first cell, and determines, according to a bit that is in a bit map and that corresponds to the cell index of the second cell in the MAC CE, to perform the activation or the deactivation on the second cell.

With reference to the fourth possible implementation manner of the second aspect, in a sixth possible implementation manner of the second aspect, the MAC CE further includes a cell index of the first cell, a cell index of the second cell, a base station identity of the first base station, and a base station identity of the second base station, so that the user equipment determines, according to the cell index of the first cell, the base station identity of the first base station, and the status identifier of the first cell that are in the MAC CE, to perform the activation or the deactivation on the first cell, and determines, according to the cell index of the second cell, the base station identity of the second base station, and the status identifier of the second cell that are in the MAC CE, to perform the activation or the deactivation on the second cell.

According to a third aspect, user equipment is provided, where the user equipment includes: a receiving unit, configured to receive a first indication sent by a master base station, where the first indication is used to indicate a status change of a first cell of the master base station or indicate a status change of a second cell of a secondary base station, and both the master base station and the secondary base station serve the user equipment and undergo carrier aggregation; and a performing unit, configured to perform activation on the first cell or the second cell according to the first indication received by the receiving unit, or perform deactivation on the first cell or the second cell according to the first indication received by the receiving unit.

With reference to the third aspect, in a third possible implementation manner of the first aspect, the receiving unit is further configured to: when the received first indication is used to indicate the status change of the first cell of the master base station, receive a second indication sent by the secondary base station, where the second indication is used to indicate the status change of the second cell of the secondary base station; and the performing unit is further configured to: when performing the activation or the deactivation on the first cell according to the first indication received by the receiving unit, perform the activation or the deactivation on the second cell according to the second indication received by the receiving unit.

With reference to the first possible implementation manner of the third aspect, in a second possible implementation manner of the third aspect, the performing unit is specifically configured to: when the first indication is a first Media Access Control control element MAC CE, determine, according to a status identifier of the first cell in the first MAC CE, to perform the activation or the deactivation on the first cell; and when the second indication is a second MAC CE, determine, according to a status identifier of the second cell in the second MAC CE, to perform the activation or the deactivation on the second cell.

With reference to the second possible implementation manner of the third aspect, in a third possible implementation manner of the third aspect, the performing unit is specifically configured to: determine, according to a bit that is in a bit map and that corresponds to a cell index of the first cell in the first MAC CE, to perform the activation or the deactivation on the first cell; and determine, according to a bit that is in a bit map and that corresponds to a cell index of the second cell in the second MAC CE, to perform the activation or the deactivation on the second cell.

With reference to the third possible implementation manner of the third aspect, in a fourth possible implementation manner of the third aspect, the user equipment further includes: an identification unit, configured to: when the cell index of the first cell and the cell index of the second cell are respectively numbered by the master base station and the secondary base station, or the cell index of the first cell is the same as the cell index of the second cell, identify, according to the first indication received by the receiving unit, that the first cell corresponds to the master base station, and determine that the bit corresponding to the cell index of the first cell is valid; and identify, according to the second indication received the receiving unit, that the second cell corresponds to the secondary base station, and determine that the bit corresponding to the cell index of the second cell is valid.

With reference to the third aspect, in a fifth possible implementation manner of the third aspect, when the first indication received by the receiving unit indicates the status change of the first cell of the master base station, the first indication is further used to indicate the status change of the second cell of the secondary base station; and the performing unit is further configured to: perform the activation or the deactivation on the first cell according to the first indication received by the receiving unit, and perform the activation or the deactivation on the second cell according to the first indication.

With reference to the fifth possible implementation manner of the third aspect, in a sixth possible implementation manner of the third aspect, the performing unit is specifically configured to: when the first indication is a Media Access Control control element MAC CE, determine, according to a status identifier of the first cell in the MAC CE, to perform the activation or the deactivation on the first cell; and determine, according to a status identifier of the second cell in the MAC CE, to perform the activation or the deactivation on the second cell.

With reference to the sixth possible implementation manner of the third aspect, in a seventh possible implementation manner of the third aspect, the performing unit is specifically configured to: when both a cell index of the first cell and a cell index of the second cell are numbered by the master base station or the secondary base station, or a cell index of the first cell is different from a cell index of the second cell, determine, according to a bit that is in a bit map and that corresponds to the cell index of the first cell in the MAC CE, to perform the activation or the deactivation on the first cell; and determine, according to a bit that is in a bit map and that corresponds to the cell index of the second cell in the MAC CE, to perform the activation or the deactivation on the second cell.

With reference to the sixth possible implementation manner of the third aspect, in an eighth possible implementation manner of the third aspect, the MAC CE received by the receiving unit further includes a cell index of the first cell, a cell index of the second cell, a base station identity of the first base station, and a base station identity of the second base station; and the performing unit is specifically configured to: determine, according to the cell index of the first cell, the base station identity of the first base station, and the status identifier of the first cell that are in the MAC CE, to perform the activation or the deactivation on the first cell; and determine, according to the cell index of the second cell, the base station identity of the second base station, and the status identifier of the second cell that are in the MAC CE, to perform the activation or the deactivation on the second cell.

According to a fourth aspect, a base station is provided. The base station serves as a master base station of user equipment and includes: a generating unit, configured to generate a first indication, where the first indication is used to indicate a status change of a first cell of the master base station or indicate a status change of a second cell of a secondary base station, and both the master base station and the secondary base station serve the user equipment and undergo carrier aggregation; and a sending unit, configured to send the first indication generated by the generating unit to the user equipment, so that the user equipment performs activation on the first cell or the second cell according to the first indication, or performs deactivation on the first cell or the second cell according to the first indication.

With reference to the fourth aspect, in a first possible implementation manner of the fourth aspect, the first indication generated by the generating unit is a first Media Access Control control element MAC CE, so that the user equipment determines, according to a status identifier of the first cell in the first MAC CE, to perform the activation or the deactivation on the first cell, where the user equipment further receives a second MAC CE that serves as a second indication and that is sent by the secondary base station, so that the user equipment determines, according to a status identifier of the second cell in the second MAC CE, to perform the activation or the deactivation on the second cell.

With reference to the first possible implementation manner of the fourth aspect, in a second possible implementation manner of the fourth aspect, the base station further includes: a first numbering unit, configured to number a cell index of the first cell of the master base station, where the cell index of the first cell is the same as or different from a cell index that is numbered by the secondary base station for the second cell, so that the user equipment identifies, according to the received first indication, that the first cell corresponds to the master base station, and determines that a bit corresponding to the cell index of the first cell is valid; and identifies, according to the received second indication, that the second cell corresponds to the secondary base station, and determines that a bit corresponding to the cell index of the second cell is valid.

With reference to the fourth aspect, in a third possible implementation manner of the fourth aspect, the first indication generated by the generating unit is further used to indicate the status change of the second cell of the secondary base station, so that the user equipment performs the activation or the deactivation on the second cell according to the first indication.

With reference to the third possible implementation manner of the fourth aspect, in a fourth possible implementation manner of the fourth aspect, the first indication generated by the generating unit is a first Media Access Control control element MAC CE, so that the user equipment determines, according to a status identifier of the first cell in the MAC CE, to perform the activation or the deactivation on the first cell, and determines, according to a status identifier of the second cell in the MAC CE, to perform the activation or the deactivation on the second cell.

With reference to the fourth possible implementation manner of the fourth aspect, in a fifth possible implementation manner of the fourth aspect, the base station further includes: a second numbering unit, configured to number both a cell index of the first cell and a cell index of the second cell, so that the user equipment determines, according to a bit that is in a bit map and that corresponds to the cell index of the first cell in the MAC CE, to perform the activation or the deactivation on the first cell, and determines, according to a bit that is in a bit map and that corresponds to the cell index of the second cell in the MAC CE, to perform the activation or the deactivation on the second cell.

With reference to the fourth possible implementation manner of the fourth aspect, in a sixth possible implementation manner of the fourth aspect, the MAC CE generated by the generating unit further includes a cell index of the first cell, a cell index of the second cell, a base station identity of the first base station, and a base station identity of the second base station, so that the user equipment determines, according to the cell index of the first cell, the base station identity of the first base station, and the status identifier of the first cell that are in the MAC CE, to perform the activation or the deactivation on the first cell, and determines, according to the cell index of the second cell, the base station identity of the second base station, and the status identifier of the second cell that are in the MAC CE, to perform the activation or the deactivation on the second cell.

According to a fifth aspect, user equipment is provided. The user equipment includes a wireless transceiver and a processor, where the wireless transceiver is configured to receive a first indication sent by a master base station, where the first indication is used to indicate a status change of a first cell of the master base station or indicate a status change of a second cell of a secondary base station, and both the master base station and the secondary base station serve the user equipment and undergo carrier aggregation; and the processor is configured to perform activation on the first cell or the second cell according to the first indication, or perform deactivation on the first cell or the second cell according to the first indication.

With reference to the fifth aspect, in a third possible implementation manner of the fifth aspect, the wireless transceiver is further configured to: when the received first indication is used to indicate the status change of the first cell of the master base station, receive a second indication sent by the secondary base station, where the second indication is used to indicate the status change of the second cell of the secondary base station; and the processor is further configured to: when performing the activation or the deactivation on the first cell according to the first indication, perform the activation or the deactivation on the second cell according to the second indication.

With reference to the first possible implementation manner of the fifth aspect, in a second possible implementation manner of the fifth aspect, the processor is specifically configured to: when the first indication is a first Media Access Control control element MAC CE, determine, according to a status identifier of the first cell in the first MAC CE, to perform the activation or the deactivation on the first cell; and when the second indication is a second MAC CE, determine, according to a status identifier of the second cell in the second MAC CE, to perform the activation or the deactivation on the second cell.

With reference to the second possible implementation manner of the fifth aspect, in a third possible implementation manner of the fifth aspect, the processor is specifically configured to: determine, according to a bit that is in a bit map and that corresponds to a cell index of the first cell in the first MAC CE, to perform the activation or the deactivation on the first cell; and determine, according to a bit that is in a bit map and that corresponds to a cell index of the second cell in the second MAC CE, to perform the activation or the deactivation on the second cell.

With reference to the third possible implementation manner of the fifth aspect, in a fourth possible implementation manner of the fifth aspect, the processor is further configured to: when the cell index of the first cell and the cell index of the second cell are respectively numbered by the master base station and the secondary base station, or the cell index of the first cell is the same as the cell index of the second cell, identify, according to the first indication, that the first cell corresponds to the master base station, and determine that the bit corresponding to the cell index of the first cell is valid; and identify, according to the second indication, that the second cell corresponds to the secondary base station, and determine that the bit corresponding to the cell index of the second cell is valid.

With reference to the fifth aspect, in a fifth possible implementation manner of the fifth aspect, the processor is further configured to: when the cell index of the first cell and the cell index of the second cell are respectively numbered by the master base station and the secondary base station, or the cell index of the first cell is the same as the cell index of the second cell, identify, according to the first indication, that the first cell corresponds to the master base station, and determine that the bit corresponding to the cell index of the first cell is valid; and identify, according to the second indication, that the second cell corresponds to the secondary base station, and determine that the bit corresponding to the cell index of the second cell is valid.

With reference to the fifth possible implementation manner of the fifth aspect, in a sixth possible implementation manner of the fifth aspect, the processor is specifically configured to: when the first indication is a Media Access Control control element MAC CE, determine, according to a status identifier of the first cell in the MAC CE, to perform the activation or the deactivation on the first cell; and determine, according to a status identifier of the second cell in the MAC CE, to perform the activation or the deactivation on the second cell.

With reference to the sixth possible implementation manner of the fifth aspect, in a seventh possible implementation manner of the fifth aspect, the processor is specifically configured to: when both a cell index of the first cell and a cell index of the second cell are numbered by the master base station or the secondary base station, or a cell index of the first cell is different from a cell index of the second cell, determine, according to a bit that is in a bit map and that corresponds to the cell index of the first cell in the MAC CE, to perform the activation or the deactivation on the first cell; and determine, according to a bit that is in a bit map and that corresponds to the cell index of the second cell in the MAC CE, to perform the activation or the deactivation on the second cell.

With reference to the sixth possible implementation manner of the fifth aspect, in an eighth possible implementation manner of the fifth aspect, the MAC CE received by the wireless transceiver further includes a cell index of the first cell, a cell index of the second cell, a base station identity of the first base station, and a base station identity of the second base station; and the processor is specifically configured to: determine, according to the cell index of the first cell, the base station identity of the first base station, and the status identifier of the first cell that are in the MAC CE, to perform the activation or the deactivation on the first cell; and determine, according to the cell index of the second cell, the base station identity of the second base station, and the status identifier of the second cell that are in the MAC CE, to perform the activation or the deactivation on the second cell.

According to a sixth aspect, a base station is provided, where the base station serves as a master base station of user equipment and includes a transceiver and a processor, where the processor is configured to generate a first indication, where the first indication is used to indicate a status change of a first cell of the master base station or indicate a status change of a second cell of a secondary base station, and both the master base station and the secondary base station serve the user equipment and undergo carrier aggregation; and the transceiver is configured to send the first indication to the user equipment, so that the user equipment performs activation on the first cell or the second cell according to the first indication, or performs deactivation on the first cell or the second cell according to the first indication.

With reference to the sixth aspect, in a first possible implementation manner of the sixth aspect, the first indication generated by the processor is a first Media Access Control control element MAC CE, so that the user equipment determines, according to a status identifier of the first cell in the first MAC CE, to perform the activation or the deactivation on the first cell, where the user equipment further receives a second MAC CE that serves as a second indication and that is sent by the secondary base station, so that the user equipment determines, according to a status identifier of the second cell in the second MAC CE, to perform the activation or the deactivation on the second cell.

With reference to the first possible implementation manner of the sixth aspect, in a second possible implementation manner of the sixth aspect, the processor is further configured to number a cell index of the first cell of the master base station, where the cell index of the first cell is the same as or different from a cell index that is numbered by the secondary base station for the second cell, so that the user equipment identifies, according to the received first indication, that the first cell corresponds to the master base station, and determines that a bit corresponding to the cell index of the first cell is valid; and identifies, according to the received second indication, that the second cell corresponds to the secondary base station, and determines that a bit corresponding to the cell index of the second cell is valid.

With reference to the sixth aspect, in a third possible implementation manner of the sixth aspect, the first indication generated by the processor is further used to indicate the status change of the second cell of the secondary base station, so that the user equipment performs the activation or the deactivation on the second cell according to the first indication.

With reference to the third possible implementation manner of the sixth aspect, in a fourth possible implementation manner of the sixth aspect, the first indication generated by the processor is a first Media Access Control control element MAC CE, so that the user equipment determines, according to a status identifier of the first cell in the MAC CE, to perform the activation or the deactivation on the first cell, and determines, according to a status identifier of the second cell in the MAC CE, to perform the activation or the deactivation on the second cell.

With reference to the fourth possible implementation manner of the sixth aspect, in a fifth possible implementation manner of the sixth aspect, the processor is further configured to number both a cell index of the first cell and a cell index of the second cell, so that the user equipment determines, according to a bit that is in a bit map and that corresponds to the cell index of the first cell in the MAC CE, to perform the activation or the deactivation on the first cell, and determines, according to a bit that is in a bit map and that corresponds to the cell index of the second cell in the MAC CE, to perform the activation or the deactivation on the second cell.

With reference to the fourth possible implementation manner of the sixth aspect, in a sixth possible implementation manner of the sixth aspect, the MAC CE generated by the processor further includes a cell index of the first cell, a cell index of the second cell, a base station identity of the first base station, and a base station identity of the second base station, so that the user equipment determines, according to the cell index of the first cell, the base station identity of the first base station, and the status identifier of the first cell that are in the MAC CE, to perform the activation or the deactivation on the first cell, and determines, according to the cell index of the second cell, the base station identity of the second base station, and the status identifier of the second cell that are in the MAC CE, to perform the activation or the deactivation on the second cell.

In the embodiments of the present invention, UE receives a first indication sent by a master base station, where the first indication is used to indicate a status change of a first cell of the master base station or indicate a status change of a second cell of a secondary base station; and performs activation on the first cell or the second cell according to the first indication, or performs deactivation on the first cell or the second cell according to the first indication. In the embodiments of the present invention, both the master base station and the secondary base station serve the UE and undergo carrier aggregation, and the UE may obtain, by using the received first indication sent by the master base station, an active state or an inactive state of a serving cell that belongs to a base station that serves the UE, so that activation or deactivation can be performed on all serving cells. This implements management of the activation or the deactivation of serving cells that belong to multiple base stations during the carrier aggregation.

BRIEF DESCRIPTION OF THE DRAWINGS

To describe the technical solutions in the embodiments more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following embodiments provide a cell status changing method, UE, and a base station, so that the UE can manage activation or deactivation of serving cells that belong to multiple base stations during CA.

To make persons skilled in the art better understand the technical solutions in the embodiments, and to make the foregoing objectives, features, and advantages of the embodiments of the present invention clearer and more comprehensible, the following further describes the technical solutions in the embodiments of the present invention in detail with reference to the accompanying drawings.

Figure 1A:
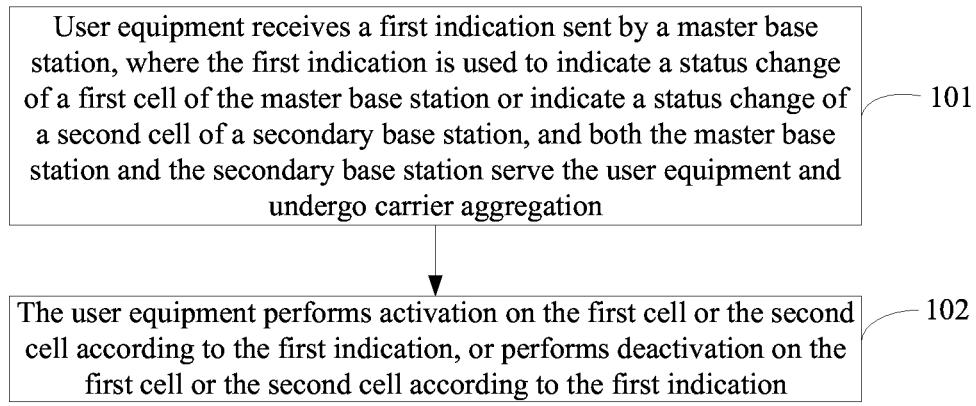
FIG. 1A is a flowchart of an embodiment of a cell status changing method.

Referring to FIG. 1A, FIG. 1A is a flowchart of an embodiment of a cell status changing method. In this embodiment, a cell status changing process is described from a perspective of a user equipment side.

Step 101: User equipment receives a first indication sent by a master base station, where the first indication is used to indicate a status change of a first cell of the master base station or indicate a status change of a second cell of a secondary base station, and both the master base station and the secondary base station serve the user equipment and undergo carrier aggregation.

In a first optional implementation manner, the user equipment receives the first indication sent by the master base station, where the first indication is used to indicate the status change of the first cell of the master base station; and the user equipment receives a second indication sent by the secondary base station, where the second indication is used to indicate the status change of the second cell of the secondary base station. The first indication may be a first Media Access Control control element (MAC CE), and the second indication may be a second MAC CE. Each bit in a MAC CE is used to carry a bit value indicating an active state or an inactive state of a cell corresponding to a cell index indicated by the bit.

Further, in this embodiment, a cell index of the first cell and a cell index of the second cell may be respectively numbered by the master base station and the secondary base station, or a cell index of the first cell is the same as a cell index of the second cell. Correspondingly, the user equipment may identify, according to the received first indication, that the first cell corresponds to the master base station, and determine that a bit corresponding to the cell index of the first cell is valid; and the user equipment may identify, according to the received second indication, that the second cell corresponds to the secondary base station, and determine that a bit corresponding to the cell index of the second cell is valid.

In a second optional implementation manner, the user equipment receives the first indication sent by the master base station, where the first indication is used to indicate the status change of the first cell of the master base station and indicate the status change of the second cell of the secondary base station. The first indication is a MAC CE, and each bit in the MAC CE is used to carry a bit value indicating an active state or an inactive state of a cell corresponding to a cell index indicated by the bit.

Step 102: The user equipment performs activation on the first cell or the second cell according to the first indication, or performs deactivation on the first cell or the second cell according to the first indication.

For the first optional implementation manner in step 101, the user equipment performs the activation or the deactivation on the first cell according to the first indication, and performs the activation or the deactivation on the second cell according to the second indication. The user equipment may determine, according to a status identifier of the first cell in the first MAC CE, to perform the activation or the deactivation on the first cell; and determine, according to a status identifier of the second cell in the second MAC CE, to perform the activation or the deactivation on the second cell. Specifically, the user equipment may determine, according to a bit that is in a bit map and that corresponds to the cell index of the first cell in the first MAC CE, to perform the activation or the deactivation on the first cell; and determine, according to a bit that is in a bit map and that corresponds to the cell index of the second cell in the second MAC CE, to perform the activation or the deactivation on the second cell.

For the second optional implementation manner in step 101, the user equipment performs the activation or the deactivation on the first cell according to the first indication, and performs the activation or the deactivation on the second cell according to the first indication. The user equipment may determine, according to a status identifier of the first cell in the MAC CE, to perform the activation or the deactivation on the first cell; and determine, according to a status identifier of the second cell in the MAC CE, to perform the activation or the deactivation on the second cell.

Further, both a cell index of the first cell and a cell index of the second cell may be numbered by the master base station or the secondary base station, or a cell index of the first cell is different from a cell index of the second cell. Specifically, the user equipment determines, according to a bit that is in a bit map and that corresponds to the cell index of the first cell in the MAC CE, to perform the activation or the deactivation on the first cell, and determines, according to a bit that is in a bit map and that corresponds to the cell index of the second cell in the MAC CE, to perform the activation or the deactivation on the second cell.

Alternatively, further, the MAC CE further includes a cell index of the first cell, a cell index of the second cell, a base station identity of the first base station, and a base station identity of the second base station. Specifically, the user equipment determines, according to the cell index of the first cell, the base station identity of the first base station, and the status identifier of the first cell that are in the MAC CE, to perform the activation or the deactivation on the first cell, and determines, according to the cell index of the second cell, the base station identity of the second base station, and the status identifier of the second cell that are in the MAC CE, to perform the activation or the deactivation on the second cell.

It can be seen from the foregoing embodiment that, this embodiment is applied to a scenario in which both a master base station and a secondary base station serve UE and undergo carrier aggregation, and the UE may obtain, by using a received first indication sent by the master base station, an active state or an inactive state of a serving cell that belongs to a base station that serves the UE, so that activation or deactivation can be performed on all serving cells. This implements management of the activation or the deactivation of serving cells that belong to multiple base stations during the carrier aggregation.

Figure 1B:
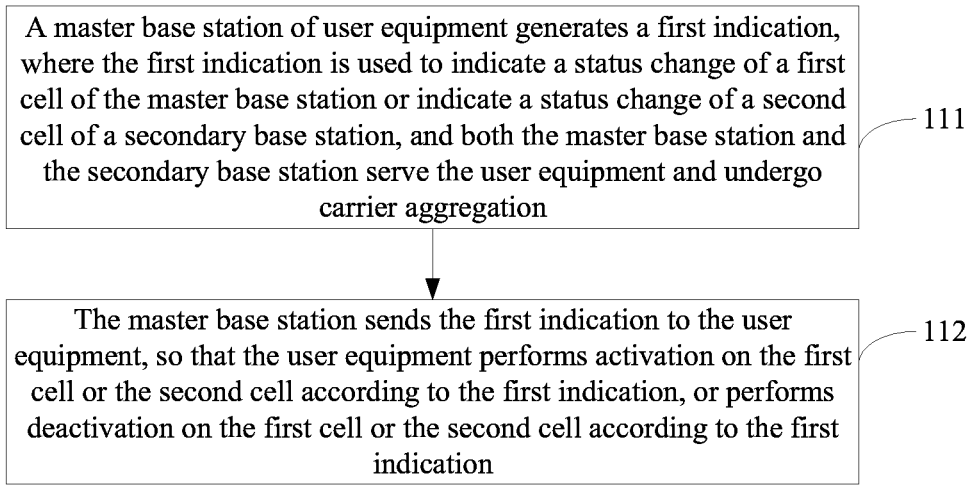
FIG. 1B is a flowchart of another embodiment of a cell status changing method.

Referring to FIG. 1B, FIG. 1B is a flowchart of another embodiment of a cell status changing method. In this embodiment, a cell status changing process is described from a perspective of a base station side.

Step 111: A master base station of user equipment generates a first indication, where the first indication is used to indicate a status change of a first cell of the master base station or indicate a status change of a second cell of a secondary base station, and both the master base station and the secondary base station serve the user equipment and undergo carrier aggregation.

In a first optional implementation manner, the first indication may be a first MAC CE, so that the user equipment determines, according to a status identifier of the first cell in the first MAC CE, to perform activation or deactivation on the first cell, where the user equipment further receives a second MAC CE that serves as a second indication and that is sent by the secondary base station, so that the user equipment determines, according to a status identifier of the second cell in the second MAC CE, to perform activation or deactivation on the second cell.

Further, the master base station may number a cell index of the first cell of the master base station, where the cell index of the first cell is the same as or different from a cell index that is numbered by the secondary base station for the second cell, so that the user equipment identifies, according to the received first indication, that the first cell corresponds to the master base station, and determines that a bit corresponding to the cell index of the first cell is valid; and identifies, according to the received second indication, that the second cell corresponds to the secondary base station, and determines that a bit corresponding to the cell index of the second cell is valid.

In a second optional implementation manner, the first indication may be further used to indicate the status change of the second cell of the secondary base station, so that the user equipment performs activation or deactivation on the second cell according to the first indication. Specifically, the first indication may be a first MAC CE, so that the user equipment determines, according to a status identifier of the first cell in the MAC CE, to perform activation or deactivation on the first cell, and determines, according to a status identifier of the second cell in the MAC CE, to perform the activation or the deactivation on the second cell.

The master base station may number both a cell index of the first cell and a cell index of the second cell, so that the user equipment determines, according to a bit that is in a bit map and that corresponds to the cell index of the first cell in the MAC CE, to perform the activation or the deactivation on the first cell, and determines, according to a bit that is in a bit map and that corresponds to the cell index of the second cell in the MAC CE, to perform the activation or the deactivation on the second cell.

Alternatively, the MAC CE generated by the master base station may further include a cell index of the first cell, a cell index of the second cell, a base station identity of the first base station, and a base station identity of the second base station, so that the user equipment determines, according to the cell index of the first cell, the base station identity of the first base station, and the status identifier of the first cell that are in the MAC CE, to perform the activation or the deactivation on the first cell, and determines, according to the cell index of the second cell, the base station identity of the second base station, and the status identifier of the second cell that are in the MAC CE, to perform the activation or the deactivation on the second cell.

Step 112: The master base station sends the first indication to the user equipment, so that the user equipment performs activation on the first cell or the second cell according to the first indication, or performs deactivation on the first cell or the second cell according to the first indication.

It can be seen from the foregoing embodiment that, this embodiment is applied to a scenario in which both a master base station and a secondary base station serve UE and undergo carrier aggregation, and the UE may obtain, by using a received first indication sent by the master base station, an active state or an inactive state of a serving cell that belongs to a base station that serves the UE, so that activation or deactivation can be performed on all serving cells. This implements management of the activation or the deactivation of serving cells that belong to multiple base stations during the carrier aggregation.

Figure 2A:
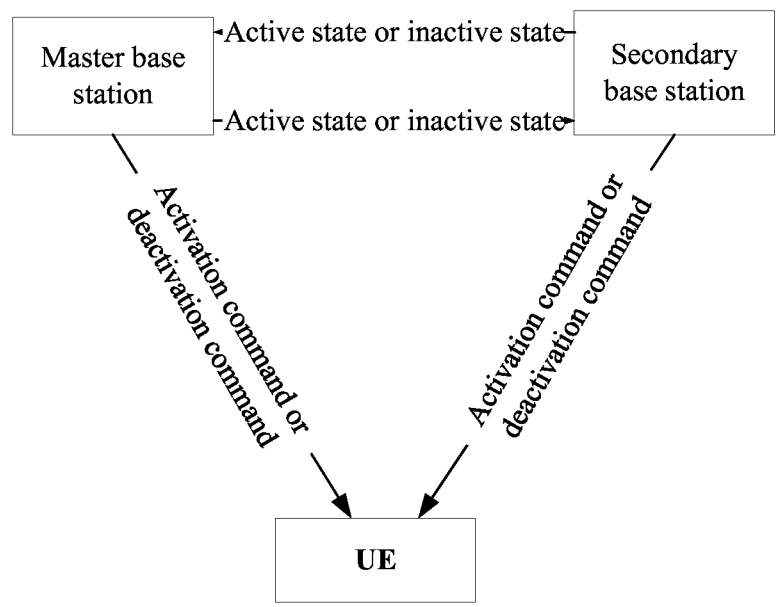
FIG. 2A is a schematic diagram of an architecture of CA between base stations that is applied to a method embodiment.

Referring to FIG. 2A, FIG. 2A is a schematic diagram of an architecture of CA between base stations that is applied to a method embodiment.

For ease of description by using an example, base stations that serve UE and that are shown in FIG. 2A include a master base station and a secondary base station. In an actual application, base stations that serve UE may include one or more secondary base stations, which is not limited in the embodiment shown in FIG. 2A. In FIG. 2A, the master base station and the secondary base station separately deliver an activation command or a deactivation command to the UE, and the master base station and the secondary base station may exchange an active state or an inactive state of their respective cells with each other.

Figure 2B:
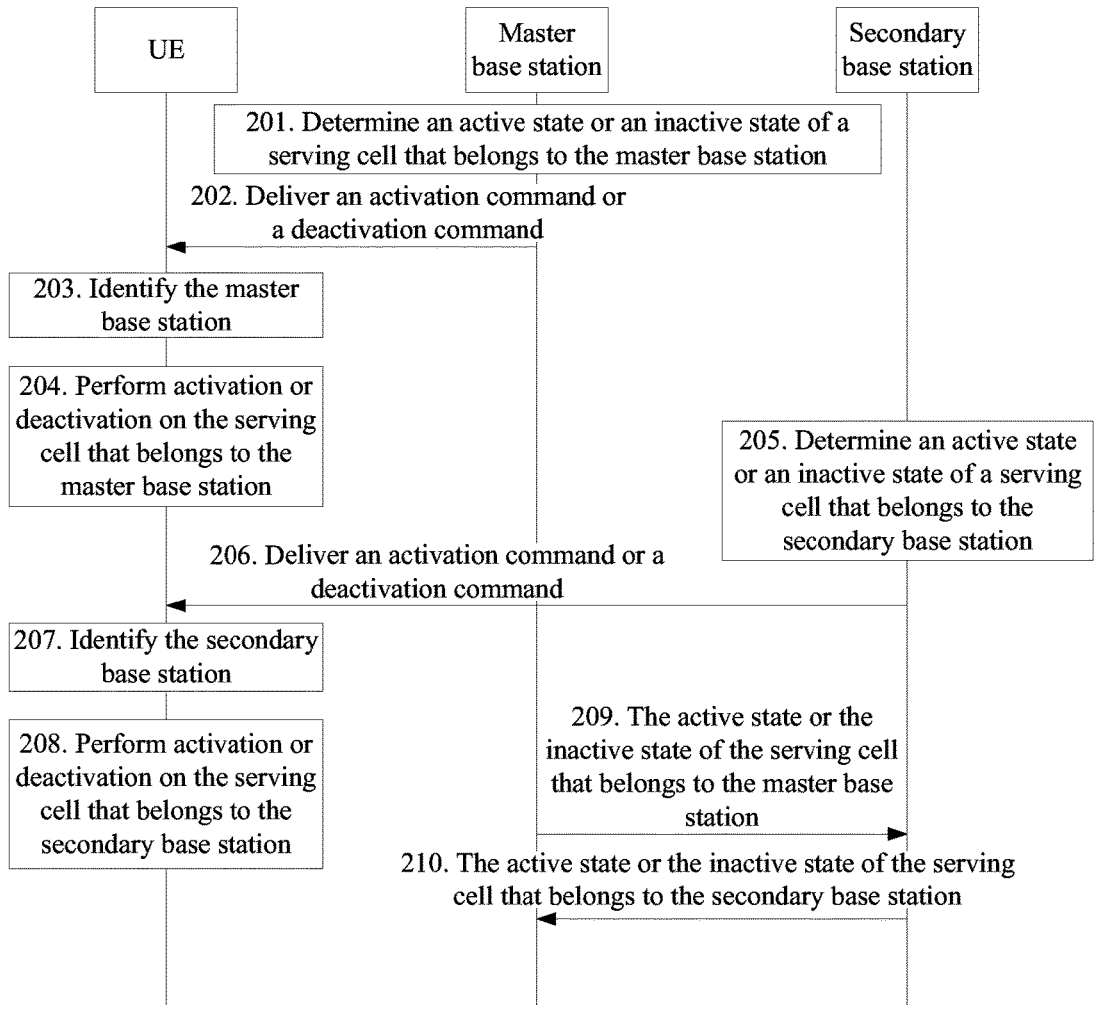
FIG. 2B is a flowchart of another embodiment of a cell status changing method.

Referring to FIG. 2B, FIG. 2B shows another embodiment of a cell status changing method. A process in which UE changes a cell status is described in detail in this embodiment with reference to FIG. 2A.

Step 201: The master base station determines an active state or an inactive state of a serving cell that is of the UE and that belongs to the master base station.

In this embodiment, after the master base station of the UE establishes a connection relationship with the UE, some cells that belong to the master base station become serving cells of the UE, and the master base station records a correspondence between a UE ID of the UE and cell indexes of the serving cells, and records an active state or an inactive state of each serving cell.

When the master base station needs to control active states or inactive states of the serving cells of the UE, an active state or an inactive state of each serving cell that is of the UE and that belongs to the master base station may be determined. For example, the active states or the inactive states of all the serving cells may be determined, or only an active state or an inactive state of a serving cell whose active state or inactive state is changed may be determined.

Step 202: The master base station delivers, to the UE, an activation command or a deactivation command including a change of the active state or the inactive state of the serving cell that is of the UE and that belongs to the master base station.

The activation command or the deactivation command delivered by the master base station may be specifically a MAC CE, where the MAC CE may indicate, by using seven bits in a bit map, active states or inactive states of seven serving cells that belong to the master base station, that is, each bit in the bit map may be used to carry a bit value indicating an active state or an inactive state of a serving cell corresponding to a cell index indicated by the bit. In this embodiment, cell indexes may be cell indexes respectively configured by the master base station and the secondary base station alone for their respective cells, and therefore, cell indexes of serving cells of the master base station may be the same as cell indexes of some serving cells of the secondary base station; or cell indexes may be cell indexes configured by the master base station or the secondary base station for all cells that belong to the master base station and the secondary base station, and therefore ell indexes of all cells of the master base station and the secondary base station may be different.

Figure 2C:
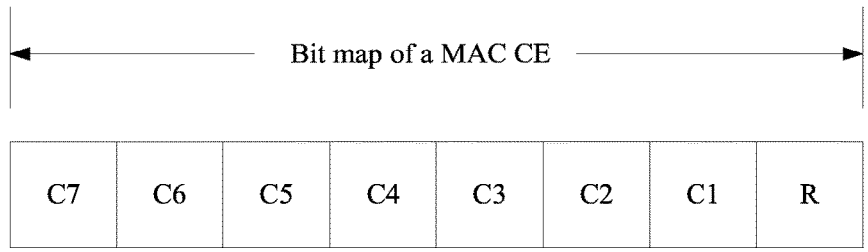
FIG. 2C is a schematic structural diagram of a MAC CE.

Referring to FIG. 2C, FIG. 2C is a schematic structural diagram of a MAC CE according to an embodiment of the present invention. The MAC CE includes eight bit map bits, which are seven bits Cj (j equals 1 to 7) representing active states or inactive states corresponding to different serving cells, and one reserved bit (R). In this embodiment, when the master base station allocates the cell indexes to the serving cells of the master base station alone, that is, when one cell is added, the master base station allocates one cell index to the cell, a bit value of each Cj shown in FIG. 2C represents an active state or an inactive state of a cell that belongs to the master base station and that is indicated by a cell index corresponding to the Cj. When the master base station or the secondary base station allocates cell indexes to all serving cells, cell indexes corresponding to some bit values in the Cjs indicate active states or inactive states of cells that belong to the master base station, and cell indexes corresponding to other bit values indicate active states or inactive states of cells that belong to the secondary base station. For each bit, when it is assumed that a bit value is 0, it may be determined that a serving cell corresponding to the bit is in an inactive state; when a bit value is 1, it may be determined that a serving cell corresponding to the bit is in an active state.

Step 203: The UE identifies the master base station that sends the activation command or the deactivation command.

In this embodiment, the UE saves a correspondence between a cell index and a base station in advance, and after receiving the activation command or the deactivation command delivered by the master base station by using the serving cell, the UE may learn, according to a cell index of the serving cell that sends the activation command or the deactivation command, that a base station corresponding to the cell index is the master base station; or the UE may directly identify, according to a base station ID that is of the master base station and that is carried in the activation command or the deactivation command, that a serving base station that sends the activation command or the deactivation command is the master base station.

Step 204: The UE performs activation or deactivation on the serving cell that belongs to the master base station.

With reference to step 202 and FIG. 2C, it can be learned that, when the master base station configures cell indexes for cells of the master base station alone, all bits in the bit map of the MAC CE correspond to the cells that belong to the master base station, and the UE may read a bit value of each bit in the MAC CE, and then perform, according to an active state or an inactive state indicated by the bit value, activation or deactivation on a serving cell that belongs to the master base station and that is indicated by a cell index corresponding to the bit.

With reference to step 202 and FIG. 2C, it can be learned that, when the master base station or the secondary base station configures the cell indexes for all the cells that belong to the master base station and the secondary base station, some bits in the bit map of the MAC CE correspond to cells that belong to the master base station, and the UE may read only bits of serving cells that belong to the master base station and ignore other bits, that is, only bits corresponding to cell indexes of the serving cells that belong to the master base station are valid, and the UE may perform, according to active states or inactive states indicated by bit values of the read bits, activation or deactivation on the serving cells that belong to the master base station and that are indicated by the cell indexes corresponding to the bits.

Step 205: The secondary base station determines an active state or an inactive state of a serving cell that is of the UE and that belongs to the secondary base station.

In this embodiment, after the secondary base station of the UE establishes a connection relationship with the UE, some cells that belong to the secondary base station become serving cells of the UE, and the secondary base station records a correspondence between a UE ID of the UE and cell indexes of the serving cells, and records an active state or an inactive state of each serving cell.

When the secondary base station needs to control active states or inactive states of the serving cells of the UE, an active state or an inactive state of each serving cell that is of the UE and that belongs to the secondary base station may be determined. For example, the active states or the inactive states of all the serving cells may be determined, or only an active state or an inactive state of a serving cell whose active state or inactive state is changed may be determined.

Step 206: The secondary base station delivers, to the UE, an activation command or a deactivation command including a change of the active state or the inactive state of the serving cell that is of the UE and that belongs to the secondary base station.

Similar to the description in step 202, the activation command or the deactivation command delivered by the secondary base station may be specifically a MAC CE, where the MAC CE may indicate, by using seven bits in a bit map, active states or inactive states of seven serving cells that belong to the secondary base station, that is, each bit in the bit map may be used to carry a bit value indicating an active state or an inactive state of a serving cell corresponding to a cell index indicated by the bit. In this embodiment, cell indexes may be cell indexes respectively configured by the master base station and the secondary base station alone for their respective cells, and therefore, cell indexes of serving cells of the master base station may be the same as cell indexes of some serving cells of the secondary base station; or cell indexes may be cell indexes configured by the master base station or the secondary base station for all cells that belong to the master base station and the secondary base station, and therefore, cell indexes of all cells of the master base station and the secondary base station may be different.

Still referring to the schematic structural diagram that is of the bit map of the MAC CE and that is shown in FIG. 2C. The MAC CE includes eight bit map bits, which are seven bits $C_j$ (j equals 1 to 7) representing active states or inactive states corresponding to different serving cells, and one reserved bit (R). In this embodiment, when the secondary base station allocates the cell indexes to the serving cells of the secondary base station alone, a bit value of each $C_j$ shown in FIG. 2C represents an active state or an inactive state of a cell that belongs to the secondary base station and that is indicated by a cell index corresponding to the $C_j$; when the master base station or the secondary base station allocates cell indexes to all serving cells, cell indexes corresponding to some bit values in the $C_j$s indicate active states or inactive states of cells that belong to the master base station, and cell indexes corresponding to other bit values indicate active states or inactive states of cells that belong to the secondary base station.

Step 207: The UE identifies the secondary base station that sends the activation command or the deactivation command.

Similar to the description in step 203, the UE saves a correspondence between a cell index and a base station in advance, and after receiving the activation command or the deactivation command delivered by the secondary base station by using the serving cell, the UE may learn, according to a cell index of the serving cell that sends the activation command or the deactivation command, that a base station corresponding to the cell index is the secondary base station; or the UE may directly identify, according to a base station ID that is of the secondary base station and that is carried in the activation command or the deactivation command, that a serving base station that sends the activation command or the deactivation command is the secondary base station.

Step 208: The UE performs activation or deactivation on the serving cell that belongs to the secondary base station.

With reference to step 206 and FIG. 2C, it can be learned that, when the secondary base station configures cell indexes for cells of the secondary base station alone, all bits in the bit map of the MAC CE correspond to the cells that belong to the secondary base station, and the UE may read a bit value of each bit in the MAC CE, and then perform, according to an active state or an inactive state indicated by the bit value, activation or deactivation on a serving cell that belongs to the secondary base station and that is indicated by a cell index corresponding to the bit.

With reference to step 206 and FIG. 2C, it can be learned that, when the master base station or the secondary base station configures the cell indexes for all the cells that belong to the master base station and the secondary base station, some bits in the bit map of the MAC CE correspond to cells that belong to the secondary base station, and the UE may read only bits of serving cells that belong to the secondary base station and ignore other bits, that is, only bits corresponding to cell indexes of the serving cells that belong to the secondary base station are valid, and the UE may perform, according to active states or inactive states indicated by bit values of the read bits, activation or deactivation on the serving cells that belong to the secondary base station and that are indicated by the cell indexes corresponding to the bits.

Step 209: The master base station sends, to the secondary base station, the active state or the inactive state of the serving cell that is of the UE and that belongs to the master base station.

In this embodiment, the master base station may set an activation timer or a deactivation timer for each serving cell of the UE, and after the activation timer or the deactivation timer of the serving cell that is of the UE and that belongs to the master base station has expired, the master base station may send, to the secondary base station, the active state or the inactive state of the serving cell that is of the UE and that belongs to the master base station.

Step 210: The secondary base station sends, to the master base station, the active state or the inactive state of the serving cell that is of the UE and that belongs to the secondary base station.

In this embodiment, the secondary base station may set an activation timer or a deactivation timer for each serving cell of the UE, and after the activation timer or the deactivation timer of the serving cell that is of the UE and that belongs to the secondary base station has expired, the secondary base station may send, to the master base station, the active state or the inactive state of the serving cell that is of the UE and that belongs to the secondary base station.

In the architecture of CA between base stations, the master base station receives a channel quality indicator (CQI) report reported by the UE, and the master base station needs to decode the CQI report according to active states or inactive states of all serving cells of the UE. When the master base station does not learn an active state or an inactive state of a serving cell that belongs to the secondary base station, the master base station needs to decode the CQI report by using different decoding formats. In this embodiment, because the master base station may obtain, by interacting with the secondary base station, activation or deactivation information of the serving cell that belongs to the secondary base station, the master base station can decode the received CQI report in one way, that is, one decoding format is used to decode the CQI report. Therefore, decoding efficiency of the master base station can be improved.

It should be noted that, in the foregoing embodiment, step 201 to step 204, step 205 to step 208, and step 209 to step 210 may be performed in a different sequence, and a sequence in FIG. 2B is merely exemplary and is not intended to limit the embodiments.

It can be seen from the foregoing embodiment that, this embodiment is applied to a scenario in which both a master base station and a secondary base station serve UE and undergo carrier aggregation, and the UE may obtain, by using a received first indication sent by the master base station, an active state or an inactive state of a serving cell that belongs to a base station that serves the UE, so that activation or deactivation can be performed on all serving cells. This implements management of the activation or the deactivation of serving cells that belong to multiple base stations during the carrier aggregation.

Figure 3A:
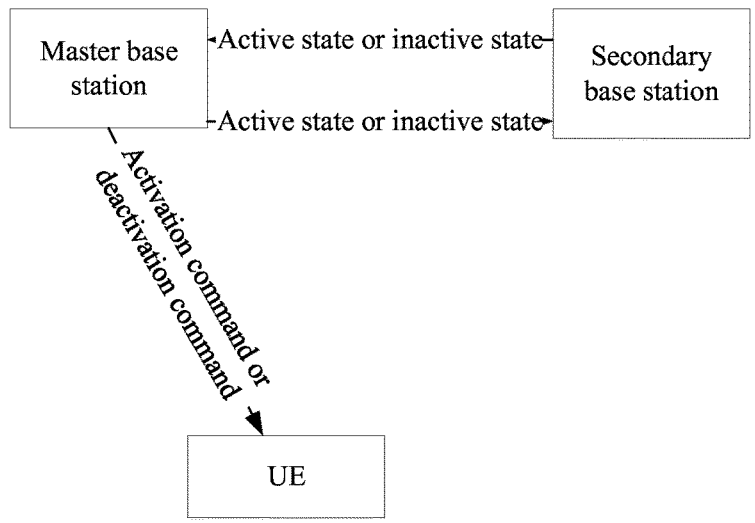
FIG. 3A is a schematic diagram of another architecture of CA between base stations that is applied to a method embodiment.

Referring to FIG. 3A, FIG. 3A is a schematic diagram of another architecture of CA between base stations that is applied to a method embodiment:

For ease of description by using an example, base stations that serve UE and that are shown in FIG. 3A include a master base station and a secondary base station. In an actual application, base stations that serve UE may include one or more secondary base stations, which is not limited in the embodiment shown in FIG. 3A. In FIG. 3A, only the master base station delivers an activation command or a deactivation command to the UE, and the master base station and the secondary base station may exchange an active state or an inactive state of their respective cells with each other.

Figure 3B:
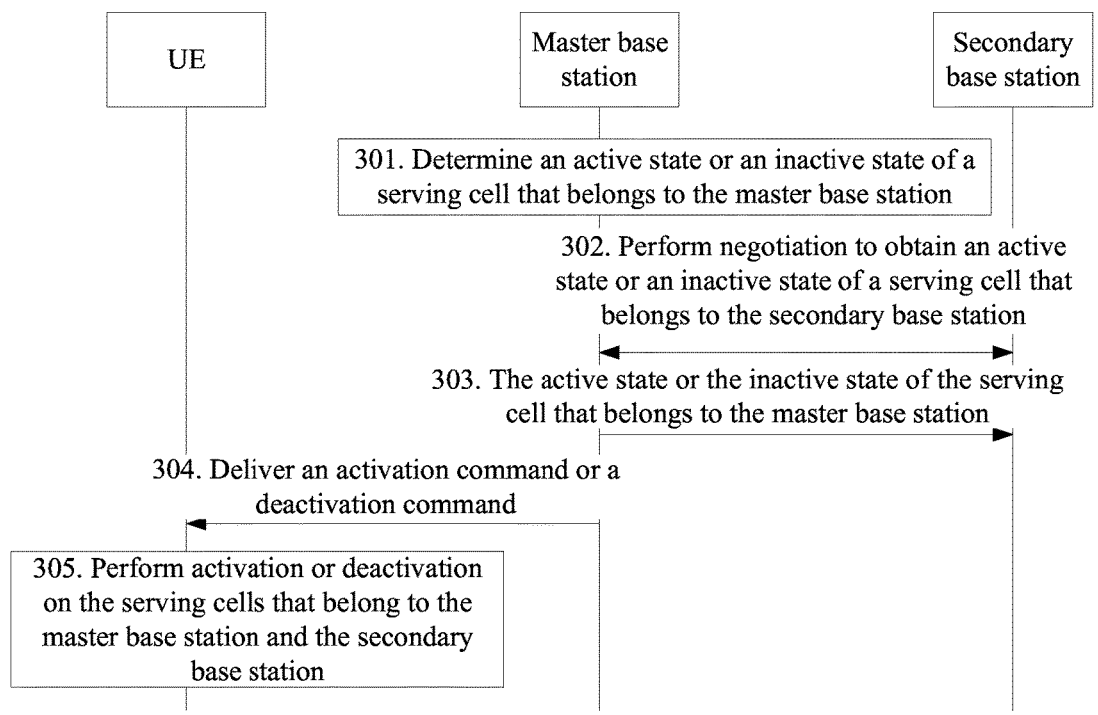
FIG. 3B is a flowchart of another embodiment of a cell status changing method.

Referring to FIG. 3B, FIG. 3B shows another embodiment of a cell status changing method according to the present invention. A process in which UE changes a cell status is described in detail in this embodiment with reference to FIG. 3A.

Step 301: The master base station determines an active state or an inactive state of a serving cell that is of the UE and that belongs to the master base station.

In this embodiment, after the master base station of the UE establishes a connection relationship with the UE, some cells that belong to the master base station become serving cells of the UE, and the master base station records a correspondence between a UE ID of the UE and cell indexes of the serving cells, and records an active state or an inactive state of each serving cell.

When the master base station needs to control active states or inactive states of the serving cells of the UE, an active state or an inactive state of each serving cell that is of the UE and that belongs to the master base station may be determined. For example, the active states or the inactive states of all the serving cells may be determined, or only an active state or an inactive state of a serving cell whose active state or inactive state is changed may be determined.

Step 302: The master base station negotiates with the secondary base station, to obtain an active state or an inactive state of a serving cell that is of the UE and that belongs to the secondary base station.

In this embodiment, before determining to activate or deactivate the serving cell that belongs to the secondary base station, the master base station may negotiate with the secondary base station, to obtain the active state or the inactive state of the serving cell that belongs to the secondary base station.

In addition, optionally, the master base station may not negotiate with the secondary base station, instead, the master base station determines the active state or the inactive state of the serving cell that belongs to the secondary base station; or, after an activation timer or a deactivation timer of the serving cell of the UE has expired, the secondary base station may send, to the master base station, the active state or the inactive state of the serving cell that is of the UE and that belongs to the secondary base station.

Step 303: The master base station sends, to the secondary base station, the active state or the inactive state of the serving cell that is of the UE and that belongs to the master base station.

In this embodiment, the master base station may set an activation timer or a deactivation timer for each serving cell of the UE, and after the activation timer or the deactivation timer of the serving cell that is of the UE and that belongs to the master base station has expired, the master base station may send, to the secondary base station, the active state or the inactive state of the serving cell that is of the UE and that belongs to the master base station. It should be noted that, this step is an optional step.

Step 304: The master base station delivers an activation command or a deactivation command to the UE, where the activation command or the deactivation command carries the active states or the inactive states of the serving cells that are of the UE and that belong to the master base station and the secondary base station.

In this embodiment, the activation command or the deactivation command delivered by the master base station may be specifically a MAC CE. For a specific structure of the MAC CE, refer to FIG. 2C. The MAC CE may indicate, by using seven bits in a bit map, active states or inactive states of seven serving cells that belong to the master base station and the secondary base station, that is, each bit in the bit map may be used to carry a bit value indicating an active state or an inactive state of a serving cell corresponding to a cell index indicated by the bit. In this embodiment, cell indexes may be cell indexes configured by the master base station or the secondary base station for all cells that belong to the master base station and the secondary base station, and therefore, cell indexes of all cells of the master base station and the secondary base station may be different.

In addition, in addition to carrying the active states or the inactive states of the serving cells in a form of bit map, the MAC CE in this embodiment may also directly carry a cell index of a serving cell of the master base station, a master base station identity, a status identifier of the serving cell that belongs to the master base station, a cell index of a serving cell of the secondary base station, a secondary base station identity, and a status identifier of the serving cell that belongs to the secondary base station, so that the UE may directly perform, according to the cell indexes, the base station identities, and the state identities of the serving cells that are carried in the MAC CE, activation or deactivation on different serving cells that belong to different base stations.

Step 305: The UE performs activation or deactivation on the serving cells that belong to the master base station and the secondary base station.

When the master base station carries the active states or the inactive states by using the bit map of the MAC CE in step 304, in this step, after receiving the MAC CE delivered by the master base station, the UE reads each bit in the bit map, obtains, according to a configuration result of cell indexes, a serving cell indicated by a cell index corresponding to each bit, and performs, according to an active state or an inactive state indicated by a bit value of the read bit, activation or deactivation on the serving cell indicated by the cell index. For example, assuming that the first bit in the bit map corresponds to a serving cell 1 that is of the master base station and whose cell index is CELL 1 and a bit value of the first bit is 1, it indicates that the serving cell 1 that belongs to the master base station is in an active state, and in this case, the UE performs activation on the serving cell 1 that belongs to the master base station; assuming that the second bit in the bit map corresponds to a serving cell 2 that is of the secondary base station and whose cell index is CELL 2 and a bit value of the second bit is 0, it indicates that the serving cell 2 that belongs to the secondary base station is in an inactive state, and in this case, the UE performs deactivation on the serving cell 2 that belongs to the secondary base station.

It can be seen from the foregoing embodiment that, this embodiment is applied to a scenario in which both a master base station and a secondary base station serve UE and undergo carrier aggregation, and the UE may obtain, by using a received first indication sent by the master base station, an active state or an inactive state of a serving cell that belongs to a base station that serves the UE, so that activation or deactivation can be performed on all serving cells. This implements management of the activation or the deactivation of serving cells that belong to multiple base stations during the carrier aggregation.

Corresponding to the embodiments of the cell status changing method according to the present invention, the present invention further provides embodiments of user equipment and a base station to which the method embodiments are applied.

Figure 4:
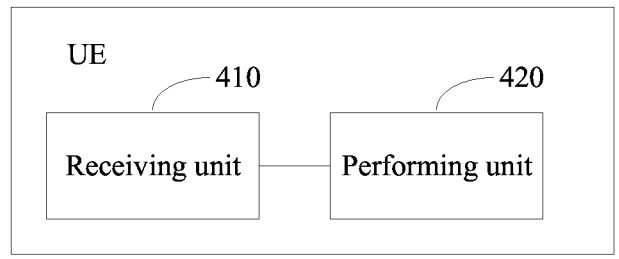
FIG. 4 is a block diagram of an embodiment of user equipment.

Referring to FIG. 4, FIG. 4 is a block diagram of an embodiment of user equipment.

The user equipment includes a receiving unit 410 and a performing unit 420.

The receiving unit 410 is configured to receive a first indication sent by a master base station, where the first indication is used to indicate a status change of a first cell of the master base station or indicate a status change of a second cell of a secondary base station, and both the master base station and the secondary base station serve the user equipment and undergo carrier aggregation.

The performing unit 420 is configured to perform activation on the first cell or the second cell according to the first indication received by the receiving unit 410, or perform deactivation on the first cell or the second cell according to the first indication received by the receiving unit.

In an optional implementation manner: the receiving unit 410 may be further configured to: when the received first indication is used to indicate the status change of the first cell of the master base station, receive a second indication sent by the secondary base station, where the second indication is used to indicate the status change of the second cell of the secondary base station; and the performing unit 420 may be further configured to: when performing the activation or the deactivation on the first cell according to the first indication received by the receiving unit 410, perform the activation or the deactivation on the second cell according to the second indication received by the receiving unit.

The performing unit 420 may be specifically configured to: when the first indication is a first Media Access Control control element MAC CE, determine, according to a status identifier of the first cell in the first MAC CE, to perform the activation or the deactivation on the first cell; and when the second indication is a second MAC CE, determine, according to a status identifier of the second cell in the second MAC CE, to perform the activation or the deactivation on the second cell.

Further, the performing unit 420 may be specifically configured to: determine, according to a bit that is in a bit map and that corresponds to a cell index of the first cell in the first MAC CE, to perform the activation or the deactivation on the first cell; and determine, according to a bit that is in a bit map and that corresponds to a cell index of the second cell in the second MAC CE, to perform the activation or the deactivation on the second cell.

Further, the user equipment may further include (not shown in FIG. 4): an identification unit, configured to: when the cell index of the first cell and the cell index of the second cell are respectively numbered by the master base station and the secondary base station, or the cell index of the first cell is the same as the cell index of the second cell, identify, according to the first indication received by the receiving unit, that the first cell corresponds to the master base station, and determine that the bit corresponding to the cell index of the first cell is valid; and identify, according to the second indication received the receiving unit, that the second cell corresponds to the secondary base station, and determine that the bit corresponding to the cell index of the second cell is valid.

In another optional implementation manner: when the first indication received by the receiving unit 410 indicates the status change of the first cell of the master base station, the first indication is further used to indicate the status change of the second cell of the secondary base station; and the performing unit 420 may be further configured to: perform the activation or the deactivation on the first cell according to the first indication received by the receiving unit 410, and perform the activation or the deactivation on the second cell according to the first indication.

The performing unit 420 may be specifically configured to: when the first indication is a MAC CE, determine, according to a status identifier of the first cell in the MAC CE, to perform the activation or the deactivation on the first cell; and determine, according to a status identifier of the second cell in the MAC CE, to perform the activation or the deactivation on the second cell.

Further, the performing unit 420 may be specifically configured to: when both a cell index of the first cell and a cell index of the second cell are numbered by the master base station or the secondary base station, or a cell index of the first cell is different from a cell index of the second cell, determine, according to a bit that is in a bit map and that corresponds to the cell index of the first cell in the MAC CE, to perform the activation or the deactivation on the first cell; and determine, according to a bit that is in a bit map and that corresponds to the cell index of the second cell in the MAC CE, to perform the activation or the deactivation on the second cell.

The MAC CE received by the receiving unit 410 may further include a cell index of the first cell, a cell index of the second cell, a base station identity of the first base station, and a base station identity of the second base station.

The performing unit 420 may be specifically configured to: determine, according to the cell index of the first cell, the base station identity of the first base station, and the status identifier of the first cell that are in the MAC CE, to perform the activation or the deactivation on the first cell; and determine, according to the cell index of the second cell, the base station identity of the second base station, and the status identifier of the second cell that are in the MAC CE, to perform the activation or the deactivation on the second cell.

Figure 5:
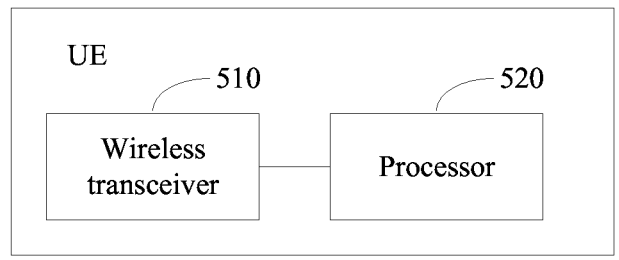
FIG. 5 is a block diagram of another embodiment of user equipment.

Referring to FIG. 5, FIG. 5 is a block diagram of another embodiment of user equipment.

The UE includes a wireless transceiver 510 and a processor 520.

The wireless transceiver 510 is configured to receive a first indication sent by a master base station, where the first indication is used to indicate a status change of a first cell of the master base station or indicate a status change of a second cell of a secondary base station, and both the master base station and the secondary base station serve the user equipment and undergo carrier aggregation.

The processor 520 is configured to perform activation on the first cell or the second cell according to the first indication, or perform deactivation on the first cell or the second cell according to the first indication.

In an optional implementation manner: the wireless transceiver 510 may be further configured to: when the received first indication is used to indicate the status change of the first cell of the master base station, receive a second indication sent by the secondary base station, where the second indication is used to indicate the status change of the second cell of the secondary base station; and the processor 520 may be further configured to: when performing the activation or the deactivation on the first cell according to the first indication, perform the activation or the deactivation on the second cell according to the second indication.

The processor 520 may be specifically configured to: when the first indication is a first MAC CE, determine, according to a status identifier of the first cell in the first MAC CE, to perform the activation or the deactivation on the first cell; and when the second indication is a second MAC CE, determine, according to a status identifier of the second cell in the second MAC CE, to perform the activation or the deactivation on the second cell.

Further, the processor 520 may be specifically configured to: determine, according to a bit that is in a bit map and that corresponds to a cell index of the first cell in the first MAC CE, to perform the activation or the deactivation on the first cell; and determine, according to a bit that is in a bit map and that corresponds to a cell index of the second cell in the second MAC CE, to perform the activation or the deactivation on the second cell.

Further, the processor 520 may be further configured to: when the cell index of the first cell and the cell index of the second cell are respectively numbered by the master base station and the secondary base station, or the cell index of the first cell is the same as the cell index of the second cell, identify, according to the first indication, that the first cell corresponds to the master base station, and determine that the bit corresponding to the cell index of the first cell is valid; and identify, according to the second indication, that the second cell corresponds to the secondary base station, and determine that the bit corresponding to the cell index of the second cell is valid.

In another optional implementation manner: when the first indication received by the wireless transceiver 510 indicates the status change of the first cell of the master base station, the first indication is further used to indicate the status change of the second cell of the secondary base station; and the processor 520 may be further configured to: perform the activation or the deactivation on the first cell according to the first indication, and perform the activation or the deactivation on the second cell according to the first indication.

The processor 520 may be specifically configured to: when the first indication is a MAC CE, determine, according to a status identifier of the first cell in the MAC CE, to perform the activation or the deactivation on the first cell; and determine, according to a status identifier of the second cell in the MAC CE, to perform the activation or the deactivation on the second cell.

Further, the processor 520 may be specifically configured to: when both a cell index of the first cell and a cell index of the second cell are numbered by the master base station or the secondary base station, or a cell index of the first cell is different from a cell index of the second cell, determine, according to a bit that is in a bit map and that corresponds to the cell index of the first cell in the MAC CE, to perform the activation or the deactivation on the first cell; and determine, according to a bit that is in a bit map and that corresponds to the cell index of the second cell in the MAC CE, to perform the activation or the deactivation on the second cell.

The MAC CE received by the wireless transceiver 510 may further include a cell index of the first cell, a cell index of the second cell, a base station identity of the first base station, and a base station identity of the second base station.

The processor 520 may be specifically configured to: determine, according to the cell index of the first cell, the base station identity of the first base station, and the status identifier of the first cell that are in the MAC CE, to perform the activation or the deactivation on the first cell; and determine, according to the cell index of the second cell, the base station identity of the second base station, and the status identifier of the second cell that are in the MAC CE, to perform the activation or the deactivation on the second cell.

Figure 6:
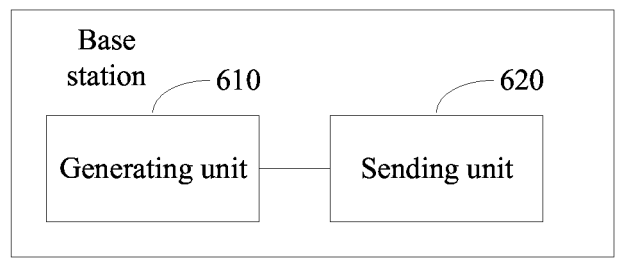
FIG. 6 is a block diagram of an embodiment of a base station.

Referring to FIG. 6, FIG. 6 is a block diagram of an embodiment of a base station, where the base station serves as a master base station of user equipment.

The base station includes a generating unit 610 and a sending unit 620.

The generating unit 610 is configured to generate a first indication, where the first indication is used to indicate a status change of a first cell of the master base station or indicate a status change of a second cell of a secondary base station, and both the master base station and the secondary base station serve the user equipment and undergo carrier aggregation.

The sending unit 620 is configured to send the first indication generated by the generating unit 610 to the user equipment, so that the user equipment performs activation on the first cell or the second cell according to the first indication, or performs deactivation on the first cell or the second cell according to the first indication.

In an optional implementation manner: the first indication generated by the generating unit 610 is a first MAC CE, so that the user equipment determines, according to a status identifier of the first cell in the first MAC CE, to perform the activation or the deactivation on the first cell, where the user equipment further receives a second MAC CE that serves as a second indication and that is sent by the secondary base station, so that the user equipment determines, according to a status identifier of the second cell in the second MAC CE, to perform the activation or the deactivation on the second cell.

Further, the base station may further include (not shown in FIG. 6): a first numbering unit, configured to number a cell index of the first cell of the master base station, where the cell index of the first cell is the same as or different from a cell index that is numbered by the secondary base station for the second cell, so that the user equipment identifies, according to the received first indication, that the first cell corresponds to the master base station, and determines that a bit corresponding to the cell index of the first cell is valid; and identifies, according to the received second indication, that the second cell corresponds to the secondary base station, and determines that a bit corresponding to the cell index of the second cell is valid.

In another optional implementation manner: the first indication generated by the generating unit 610 is further used to indicate the status change of the second cell of the secondary base station, so that the user equipment performs the activation or the deactivation on the second cell according to the first indication.

The first indication generated by the generating unit 610 is a first MAC CE, so that the user equipment determines, according to a status identifier of the first cell in the MAC CE, to perform the activation or the deactivation on the first cell, and determines, according to a status identifier of the second cell in the MAC CE, to perform the activation or the deactivation on the second cell.

Further, the base station may further include (not shown in FIG. 6): a second numbering unit, configured to number both a cell index of the first cell and a cell index of the second cell, so that the user equipment determines, according to a bit that is in a bit map and that corresponds to the cell index of the first cell in the MAC CE, to perform the activation or the deactivation on the first cell, and determines, according to a bit that is in a bit map and that corresponds to the cell index of the second cell in the MAC CE, to perform the activation or the deactivation on the second cell.

Alternatively, further, the MAC CE generated by the generating unit 610 may further include a cell index of the first cell, a cell index of the second cell, a base station identity of the first base station, and a base station identity of the second base station, so that the user equipment determines, according to the cell index of the first cell, the base station identity of the first base station, and the status identifier of the first cell that are in the MAC CE, to perform the activation or the deactivation on the first cell, and determines, according to the cell index of the second cell, the base station identity of the second base station, and the status identifier of the second cell that are in the MAC CE, to perform the activation or the deactivation on the second cell.

Figure 7:
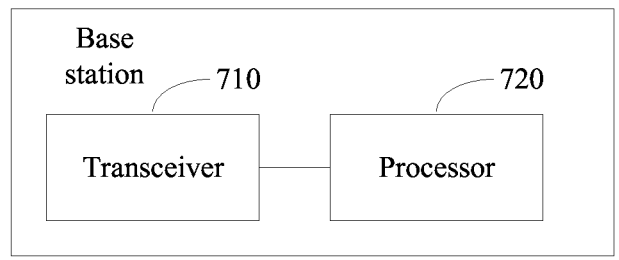
FIG. 7 is a block diagram of another embodiment of a base station.

Referring to FIG. 7, FIG. 7 is a block diagram of another embodiment of a base station, where the base station serves as a master base station of user equipment.

The base station includes a transceiver 710 and a processor 720.

The processor 720 is configured to generate a first indication, where the first indication is used to indicate a status change of a first cell of the master base station or indicate a status change of a second cell of a secondary base station, and both the master base station and the secondary base station serve the user equipment and undergo carrier aggregation.

The transceiver 710 is configured to send the first indication to the user equipment, so that the user equipment performs activation on the first cell or the second cell according to the first indication, or performs deactivation on the first cell or the second cell according to the first indication.

In an optional implementation manner: the first indication generated by the processor 720 is a first Media Access Control control element MAC CE, so that the user equipment determines, according to a status identifier of the first cell in the first MAC CE, to perform the activation or the deactivation on the first cell, where the user equipment further receives a second MAC CE that serves as a second indication and that is sent by the secondary base station, so that the user equipment determines, according to a status identifier of the second cell in the second MAC CE, to perform the activation or the deactivation on the second cell.

Further, the processor 720 may be further configured to number a cell index of the first cell of the master base station, where the cell index of the first cell is the same as or different from a cell index that is numbered by the secondary base station for the second cell, so that the user equipment identifies, according to the received first indication, that the first cell corresponds to the master base station, and determines that a bit corresponding to the cell index of the first cell is valid; and identifies, according to the received second indication, that the second cell corresponds to the secondary base station, and determines that a bit corresponding to the cell index of the second cell is valid.

In another optional implementation manner: the first indication generated by the processor 720 is further used to indicate the status change of the second cell of the secondary base station, so that the user equipment performs the activation or the deactivation on the second cell according to the first indication.

Further, the first indication generated by the processor 720 is a first Media Access Control control element MAC CE, so that the user equipment determines, according to a status identifier of the first cell in the MAC CE, to perform the activation or the deactivation on the first cell, and determines, according to a status identifier of the second cell in the MAC CE, to perform the activation or the deactivation on the second cell.

The processor 720 may be further configured to number both a cell index of the first cell and a cell index of the second cell, so that the user equipment determines, according to a bit that is in a bit map and that corresponds to the cell index of the first cell in the MAC CE, to perform the activation or the deactivation on the first cell, and determines, according to a bit that is in a bit map and that corresponds to the cell index of the second cell in the MAC CE, to perform the activation or the deactivation on the second cell.

Alternatively, the MAC CE generated by the processor 720 further includes a cell index of the first cell, a cell index of the second cell, a base station identity of the first base station, and a base station identity of the second base station, so that the user equipment determines, according to the cell index of the first cell, the base station identity of the first base station, and the status identifier of the first cell that are in the MAC CE, to perform the activation or the deactivation on the first cell, and determines, according to the cell index of the second cell, the base station identity of the second base station, and the status identifier of the second cell that are in the MAC CE, to perform the activation or the deactivation on the second cell.

It can be seen from the forgoing embodiments that UE receives a first indication sent by a master base station, where the first indication is used to indicate a status change of a first cell of the master base station or indicate a status change of a second cell of a secondary base station; and performs activation on the first cell or the second cell according to the first indication, or performs deactivation on the first cell or the second cell according to the first indication. In the embodiments of the present invention, both the master base station and the secondary base station serve the UE and undergo carrier aggregation, and the UE may obtain, by using the received first indication sent by the master base station, an active state or an inactive state of a serving cell that belongs to a base station that serves the UE, so that activation or deactivation can be performed on all serving cells. This implements management of the activation or the deactivation of serving cells that belong to multiple base stations during the carrier aggregation.

Persons skilled in the art may clearly understand that, the technologies in the embodiments of the present invention may be implemented by software in addition to a necessary general hardware platform. Based on such an understanding, the technical solutions of the present invention essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
   receiving, by a terminal, a first media access control (MAC) control element (CE);
   determining, by the terminal, the first MAC CE is sent from a master base station;
   in response to a plurality of cell indexes for service cells of the master base station and a secondary base station being numbered by the master base station such that the plurality of cell indexes of all cells of the master base station and the secondary base station are different, activating or deactivating, by the terminal, a first service cell of the master base station according to a first bit in a bit index of the first MAC CE, wherein the first bit corresponds to the first service cell of the master base station, and ignoring a second bit in the bit index of the first MAC CE, wherein the second bit corresponds to a second service cell of the secondary base station, wherein each cell index of the plurality of cell indexes corresponds to a different service cell;
   receiving, by the terminal, a second MAC CE;
   determining, by the terminal, the second MAC CE is sent from the secondary base station;
   activating or deactivating, by the terminal, the second service cell of the secondary base station according to a second bit in a bit index of the second MAC CE, wherein the second bit corresponds to the second service cell of the secondary base station, and ignoring a first bit in the bit index of the second MAC CE, wherein the first bit corresponds to the first service cell of the master base station; and
   sending, by the terminal, a channel quality indicator (CQI) to the master base station, to enable the master base station to decode the CQI according to an active state or an inactive state of the first service cell, and according to an active state or an inactive state of the second service cell, wherein the master base station receives the active state or the inactive state of the second service cell from the secondary base station before the CQI is decoded.

2. The method according to claim 1, wherein the terminal determines that the secondary base station sends the second MAC CE according to a second cell index for a serving cell of the secondary base station from which the second MAC CE is sent.

3. The method according to claim 2, further comprising:
   acquiring, by the terminal, a value of the second bit in the bit index of the second MAC CE, wherein the second bit corresponds to the second service cell of the secondary base station; and
   wherein the terminal activates or deactivates the second service cell of the secondary base station according to an activation status or a deactivation status indicated by the value of the second bit in the bit index of the second MAC CE.

4. The method according to claim 1, wherein the terminal determines that the master base station sends the first MAC CE according to a first cell index of the plurality of cell indexes for a serving cell of the master base station from which the first MAC CE is sent.

5. The method according to claim 4, further comprising:
   acquiring, by the terminal, a value of the first bit in the bit index of the first MAC CE, wherein the first bit corresponds to the first service cell of the master base station;
   wherein the terminal activates or deactivates the first service cell of the master base station according to an activation status or a deactivation status indicated by the value of the first bit in the bit index of the first MAC CE.

6. A method, comprising:
   generating, by a master base station, a first media access control (MAC) control element (CE);
   numbering, by the master base station, a plurality of cell indexes for service cells of the master base station and a secondary base station such that the plurality of cell indexes of all cells of the master base station and the secondary base station are different, each cell index of the plurality of cell indexes corresponding to a different service cell;
   transmitting, by the master base station, the first MAC CE to a terminal to so that the terminal determines that the first MAC CE is sent from the master base station and activates or deactivates a first service cell of the master base station according to a first bit in a bit index of the first MAC CE, wherein the first bit corresponds to the first service cell of the master base station, and the terminal ignores a second bit in the bit index of the first MAC CE, wherein the second bit corresponds to a second service cell of the secondary base station;
   receiving, by the master base station, a channel quality indicator (CQI) from the terminal; and
   after the master base station receives an active state or inactive state of the second service cell from the secondary base station, decoding, by the master base station, the CQI according to the active state or the inactive state of the second service cell and according to an active state or an inactive state of the first service cell.

7. The method according to claim 6, wherein the first bit indicates activation status when value of the first bit is 1 and indicates deactivation status when value of the first bit is 0.

8. A terminal comprising:
   a transmitter;
   a receiver, configured to receive a first media access control (MAC) control element (CE); and
   a processor configured to:
   determine the first MAC CE is sent from a master base station; and in response to a plurality of cell indexes for service cells of the master base station and a secondary base station being numbered by the master base station such that the plurality of cell indexes of all cells of the master base station and the secondary base station are different, activate or deactivate a first service cell of the master base station according to a first bit in a bit index of the first MAC CE, wherein the first bit corresponds to the first service cell of the master base station, and ignore a second bit in the bit index of the first MAC CE, wherein the second bit corresponds to a second service cell of a secondary base station, wherein each of the plurality of cell indexes corresponds to a different serving cell;

wherein the receiver is further configured to receive a second MAC CE; and wherein the processor is further configured to:
 determine the second MAC CE is sent from the secondary base station; and
 activate or deactivate the second service cell of the secondary base station according to a second bit in a bit index of the second MAC CE, wherein the second bit corresponds to the second service cell of the secondary base station, and ignore a first bit in the bit index of the second MAC CE, wherein the first bit corresponds to the first service cell of the master base station; and wherein the transmitter is configured to send a channel quality indicator (CQI) to the master base station, to enable the master base station to decode the CQI according to an active state or an inactive state of the first service cell, and according to an active state or an inactive state of the second service cell, wherein the master base station decodes the CQI after the master base station receives the active state or the inactive state of the second service cell from the secondary base station.

9. The terminal according to claim 8, wherein the processor is further configured to determine that the secondary base station sends the second MAC CE according to a second cell index of the plurality of cell indexes for a serving cell of the secondary base station from which the second MAC CE is sent.

10. The terminal according to claim 9, wherein the processor is further configured to:
 acquire a value of the second bit in the bit index of the second MAC CE, wherein the second bit corresponds to the second service cell of the secondary base station; and
 activate or deactivate the second service cell of the secondary base station according to an activation status or a deactivation status indicated by the value of the second bit in the bit index of the second MAC CE.

11. The terminal according to claim 8, wherein the processor is further configured to determine that the master base station sends the first MAC CE according to a first cell index of the plurality of cell indexes for a serving cell of the master base station from which the first MAC CE is sent.

12. The terminal according to claim 11, wherein the processor is further configured to:
 acquire value of the first bit in the bit index of the first MAC CE wherein the first bit corresponds to the first service cell of the master base station; and
 activate or deactivate the first service cell of the master base station according to an activation status or a deactivation status indicated by the value of the first bit in the bit index of the first MAC CE.

13. A base station, comprising:
a processor, configured to:
 generate a first media access control (MAC) control element (CE);
 number a plurality of cell indexes for service cells of the base station and a secondary base station such that the plurality of cell indexes of all cells of the base station and the secondary base station are different, each of the plurality of cell indexes corresponding to a different service cell;
a transmitter, configured to transmit the first MAC CE to a terminal so that the terminal determines that the first MAC CE is sent from the base station, activates or deactivates a first service cell of the base station according to a first bit in a bit index of the first MAC CE, wherein the first bit corresponds to the first service cell of the base station, and ignores a second bit in the bit index of the first MAC CE, wherein the second bit corresponds to a second service cell of the secondary base station; and
a receiver, configured to receive a channel quality indicator (CQI) from the terminal;
wherein the processor is further configured to decode the CQI according to an active state or an inactive state of the first service cell and according to an active state or an inactive state of the second service cell, wherein the CQI is decoded after the base station receives the active state or the inactive state of the second service cell from the secondary base station.

14. The base station according to claim 13, wherein the first bit indicates activation status when value of the first bit is 1 and indicates deactivation status when value of the first bit is 0.

* * * * *